C. WOODRING.
EGG TESTING DEVICE.
APPLICATION FILED JUNE 3, 1909.
953,886.
Patented Apr. 5, 1910.
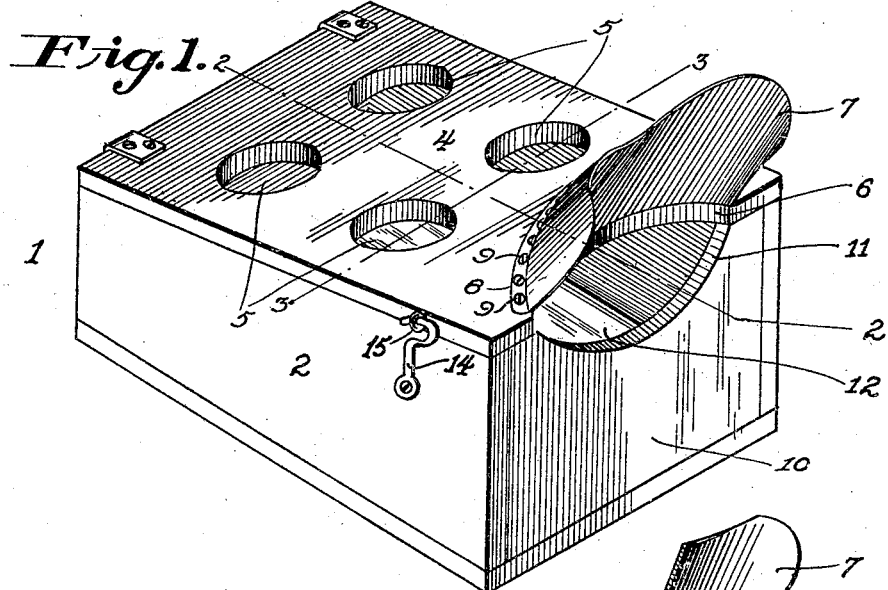
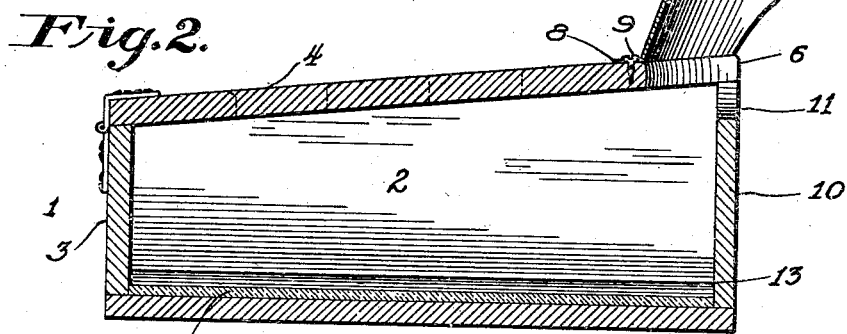
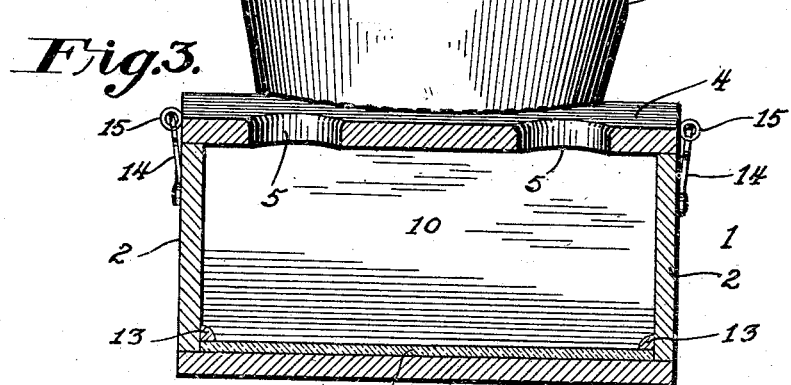
Witnesses
C. Everett Lancaster.
H. Joseph Doyle
Inventor
Chester Woodring,
By E. E. Vrooman,
his Attorney.

UNITED STATES PATENT OFFICE.

CHESTER WOODRING, OF STRONG CITY, KANSAS.

EGG-TESTING DEVICE.

953,886. Specification of Letters Patent. Patented Apr. 5, 1910.

Application filed June 3, 1909. Serial No. 500,031.

*To all whom it may concern:*

Be it known that I, CHESTER WOODRING, a citizen of the United States, residing at Strong City, in the county of Chase and State of Kansas, have invented certain new and useful Improvements in Egg-Testing Devices, of which the following is a specification, reference being had therein to the accompanying drawing.

My invention has relation to egg testers and it consists in the construction and arrangement of parts, as will be hereinafter described and particularly pointed out in the claim.

Referring to the drawing wherein a preferred and practical embodiment of the invention has been shown, Figure 1 is a perspective view of the improved egg tester. Fig. 2 is a longitudinal sectional view taken on the line 2—2, Fig. 1. Fig. 3 is a transverse sectional view taken on the line 3—3, Fig. 1.

In the accompanying drawings the improved egg tester has been shown as composed primarily of a substantially rectangularly shaped box 1 which is of a longitudinally tapering formation, the sides 2 thereof being of greater height at one end than at the other. The narrower end of the box, designated by the numeral 3 has hinged thereto a cover 4 which is provided with a plurality of spaced apart egg holding openings 5, preferably of an oval or egg shape. The free end of the cover 4 is recessed at its edge, said recess being designated by the numeral 6 and being preferably located at the center of said edge. A curved shield or eye shade 7 projects outwardly and upwardly from said recess 6 and conforms to the contour of the same and is arranged at an incline. Said shade has a flanged edge 8 which is secured to the cover around the recess 6 by means of the screws or equivalent detachable fasteners 9. The wider end 10 of the box is centrally recessed as indicated at 11 complemental to the recess 6 of the cover 4, so that when the cover is closed onto the box an elongated sight-opening is formed. The bottom of the box is flat and has mounted thereon a flat mirror or reflecting surface 12, said mirror being of a size to permit of a snug fit within the box with its edges against the sides thereof. Corner strips 13 are employed for holding said mirror rigid with the bottom of the box, said strips being of the angular beading type, the front surface of which may be rounded. The sides of the box are provided with hooks 14 which are adapted for detachable engagement with an eye 15 carried by the cover 4 so as to retain said cover closed.

It will be seen from the foregoing that the present invention provides a body or box, the top portion of which is inclined and the bottom is straight, or on an angle relative to said top, whereby the light rays entering through the egg-holding openings are delivered to the reflecting surface on an angle, so as to assure of a proper inspection of the eggs being obtained.

What I claim as my invention is:—

An egg tester, comprising a box having one end wall higher than the other with a recess in the upper edge of the higher end wall, an inclined cover provided with egg holding openings, and a recess in the edge of one of its ends forming with the recess in the higher end wall of the box a sight opening, an inclined curved shield mounted on the edge of the recess in the cover and extending diagonally over the sight opening beyond the end of the box, and a horizontal mirror located on the bottom of the box.

In testimony whereof I hereunto affix my signature in presence of two witnesses.

CHESTER WOODRING.

Witnesses:
W. W. HARVEY,
C. A. ROBINSON.